United States Patent [19]
Byler et al.

[11] 3,875,449
[45] Apr. 1, 1975

[54] COATED PHOSPHORS

[75] Inventors: William H. Byler, Landing; James J. Mattis, Long Valley, both of N.J.

[73] Assignee: U.S. Radium Corporation, Morristown, N.J.

[22] Filed: Nov. 2, 1971

[21] Appl. No.: 194,902

Related U.S. Application Data

[63] Continuation-in-part of Ser. No. 863,371, Oct. 2, 1969.

[52] U.S. Cl. ............... 313/466, 313/468, 313/473, 313/486
[51] Int. Cl. ... H01j 29/20, H01j 29/26, H01j 29/18
[58] Field of Search ............. 313/92 R, 92 PF; 117/33.5 CM X

[56] References Cited
UNITED STATES PATENTS

| | | | |
|---|---|---|---|
| 2,774,682 | 12/1956 | Larach | 117/33.5 |
| 2,864,771 | 12/1958 | Switzer et al. | 252/301.3 |
| 2,959,483 | 11/1960 | Kaplan | 117/33.5 CM X |
| 3,114,065 | 12/1963 | Kaplan | 313/92 |
| 3,204,143 | 8/1965 | Pritchard | 313/92 PF X |
| 3,275,466 | 9/1966 | Kell | 117/33.5 C |
| 3,294,569 | 12/1966 | Messineo et al. | 313/92 PH |
| 3,308,326 | 3/1967 | Kaplan | 313/92 R |
| 3,517,243 | 6/1970 | Jones | 313/92 PF |
| 3,523,905 | 8/1970 | Carvell | 313/92 PH X |
| 3,560,398 | 2/1971 | Shortes | 313/92 PH X |
| 3,664,862 | 5/1972 | Kingsley et al. | 117/33.5 CM X |
| 3,714,490 | 1/1973 | Kell | 313/92 PF X |

*Primary Examiner*—Robert Segal
*Attorney, Agent, or Firm*—Pennie & Edmonds

[57] ABSTRACT

Phosphor compositions having phosphor particles which are completely surrounded by a continuous and condensed coating of a material which alters the emission characteristics of the phosphor particles are disclosed. The coating material comprises either a filter material or a phosphor material. The coated phosphor particles can be encapsulated with a protective resin coating, such as polyvinyl alcohol.

25 Claims, 1 Drawing Figure

COATED PHOSPHORS

RELATED APPLICATIONS

This application is a continuation-in-part of our co-pending application Ser. No. 863,371, filed Oct. 2, 1969.

BACKGROUND OF THE INVENTION

I. Field of the Invention

This invention relates to coated phosphors, and more particularly, the invention relates to phosphor composites comprising phosphor core particles coated with a material which modifies the luminescent quality of the composite, said material being either a filter or a phosphor. The new phosphor composites are eminently suited for use as the phosphor coating on the image screen of a cathode ray tube.

The term "phosphor" refers to a material which is capable of exhibiting luminescence when subjected to appropriate excitation. The term "rare earth" as used in the present specification refers to yttrium and scandium plus the metals in Group III of the periodic table generally classified as lanthanide rare earths, to wit: lanthanum, cerium praseodymium, neodymium, samarium, europium, gadolinium, terbium, dysprosium, holmium, erbium, thulium, ytterbium and lutetium. The term "rare earth activator" refers to rare earth elements which when combined with a phosphor host (generally a rare earth element) activates luminescence thereof, including, for example, compounds of europium, terbium, erbium, thulium, dysprosium, ytterbium, praseodymium and gadolinium.

II. Description of the Prior Art

Cathode ray tubes which are used in color television systems contain a viewing screen which consists of a number of red-emitting, blue-emitting, and green-emitting phosphor elements. In referring to, for example, a red-emitting phosphor, the term "emitting" is conventionally omitted, and the term "red phosphor" is used. These phosphor elements are arranged on the screen in various geometric patterns which depend on the type of cathode ray tubes being considered and the shape of the phosphor elements. Of the three color emitting phosphors, the red phosphors have generally been a source of problems, due to relatively low brightness. Even the more recently developed, higher brightness red rare earth phosphors, such as europium-activated gadolinium oxide, yttrium oxide and yttrium oxysulfide, have an undesirably low brightness to reflectance ratio.

In order to obtain an optimum ratio of brightness to reflectance and eliminate some of the basic problems associated with color emitting phosphors, it has been proposed to use filters with the phosphors. U.S. Pat. Nos. 2,959,483, 3,114,065 and 3,308,326, all to Kaplan, disclose various methods for forming color filters on phosphors. U.S. Pat. Nos. 2,959,483 and 3,114,065 disclose a preference for separate layers of filter material between the phosphors and glass. The filter material used in each case, is a combination of vitreous frit and a pigment, and the pigment ends up in the form of discrete particles and not as a continuous film. U.S. Pat. No. 3,308,326 discloses copper and silver-activated zinc and cadmium sulfides, selenides and tellurides which are used with a red transmitting filter element such as cadmium sulfoselenide. Three suggestions are here disclosed as to the manner in which the filter material may be combined with the phosphors; i.e., the filter material may be used as a separate layer on the screen side of the phosphor material, the filter material may be admixed with the phosphor material, or the filter material may surround the phosphor particles as a thin coating. However, in each case the filter material is a combination of a vitreous frit and a pigment, so here again the pigment ends up in the form of discrete particles. If the cadmium sulfoselenide filter was sintered to form a continuous film in contact with Kaplan's phosphor the cadmium compounds would interdiffuse thereby degrading both the phosphor and the filter material.

Various methods are known for coating phosphors with a filter material. One such method comprises forming a dispersion of the color filter material particles in a gel forming material, such as aluminum hydroxide, and then depositing the gel on the phosphor particles. However, this process produces coated particles which are totally unsatisfactory for use within a cathode ray tube. The process results in a system containing discrete pigment particles along with extraneous materials, and thus insufficient coverage of the phosphor particles. As a result of this, relatively large amounts of pigment are required to produce satisfactory reflectance values which yield unacceptable loss of brightness. Furthermore, it is found that this method leaves a significant quantity of pigment which is not adequately bonded to the phosphor surface and is thus free to contaminate other parts of the screen.

In recent years various procedures have been proposed for obtaining multicolored displays on a cathode ray tube image screen, based on electron penetration of the phosphor coating by voltage control of the electron beam. For example, U.S. Pat. No. 3,204,143 discloses applying to a cathode ray tube screen multiple layers of phosphors, each of which emits light of a different color, separated by dead (non-luminescent) layers. U.S. Pat. No. 3,275,466 discloses multiple phosphor layers coated with an adsorptive material such as a gelatin and separated by inert layers. U.S. Pat. No. 3,294,569 discloses superimposed layers of different phosphors, between which are placed non-luminescent separator layers. These phosphors, however, are produced by tedious and time consuming procedures which are generally difficult to control and therefore do not always produce a multicolored display with the desired characteristics.

U.S. Pat. Nos. 3,523,905 and 3,560,398 disclose phosphor particles composed of a blend of zinc sulfide and cadmium sulfide activated with silver. The ratio of zinc sulfide to cadmium sulfide varies gradually from core to surface of the particle. Such phosphor particles emit light of different hues when energized with electrons at different energy levels. However, as is shown in FIG. 3 to 6 of U.S. Pat. No. 3,560,398, the emission spectra of the phosphor particle overlap at the different operating voltages preventing the emitting colors from being distinct or even substantially so.

SUMMARY OF THE INVENTION

The present invention provides a phosphor composite in particular form, each particle comprising a phosphor core of substantially uniform composition throughout, which is substantially completely surrounded by a coating of dissimilar composition which modifies the luminescent properties of the composition. Such coating may be either (1) a filter coating or (2) a phosphor coating differing in emission characteristics from the phosphor core. In either case (a) the coating should be sufficiently thin to permit transmission through and of at least a portion of the light emitted by the phosphor core particle when the latter is excited, (b) it is preferably of substantially uniform composition throughout its thickness, and (c) it should be coalesced into a substantially continuous film enveloping the underlying phosphor core particle and having substantially no part thereof uncovered.

Filter-coated phosphors according to our invention achieve a close approach to the ideal ratio of brightness to reflectance for the combination of filter material with relatively passive rare earth phosphors, thus producing new phosphor products which offer superior performance over those phosphors disclosed in the prior art. Phosphor-coated phosphors according to the present invention are uniquely suited for color display application. They have no barrier layers separating individual phosphors, and may be excited so as to exhibit the emission characteristic of either of the two phosphor compositions. These phosphor-coated particles can easily be settled in a cathode ray tube image screen by conventional techniques. This is in contrast to the tedious approach of settling layers of phosphors separated by insulating or dead layers, which are required by the prior art techniques. Both filter and phosphor coatings may be applied without substantial interdiffusion with the phosphor core particles and without otherwise degrading them at any temperature to which the coated phosphor composite is heated to sinter or fuse the coating into a continuous and condensed film about the phosphors.

Coated phosphor particles of the invention may be produced by a process which involves the preparation of water suspensions of pigment and phosphor followed by mixing, filtering, drying and heat treating to sinter. The production of high quality coated particles depends on three principal factors: (1) High degree of dispersion of the pigment. This is aided by mechanical energy such as from a blender or various ultrasonic devices, but requires also a good dispersing agent; (2) Excellent adsorption bonding. This relates to chemical compatibility and to surface condition which, again requires a suitable dispersing agent. This obviously calls for a clean pigment and a phosphor whose surface must be in a receptive condition; (3) Freedom from elements not contained in the pigment or not removed during subsequent processing steps. The final objective is to form at sintering a monolithic layer of pigment covering the entire surface area of each phosphor crystal as free as possible from optical flaws. The presence of foreign materials will interfere with the sintering and produce flaws.

DESCRIPTION OF THE PREFERRED EMBODIMENTS

Figure 1:
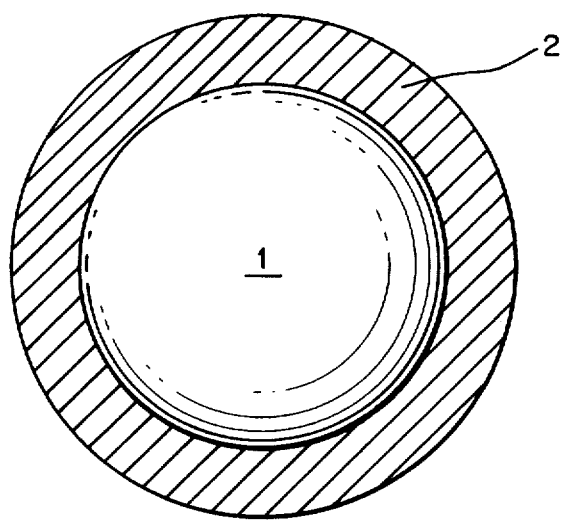
FIG. 1 is a cross-sectional view of a coated phosphor particle.

With reference to FIG. 1 this invention relates to coated phosphors, and more particularly, the invention relates to phosphor composites comprising a phosphore core 1 having a coating 2 which is a material which modifies the luminescent quality of the composite, said material being either a filter or a phosphor.

According to the invention, the filter coating pigment which is in powder form, is mixed with deionized water, a dispersing agent and a solution containing a non-ionic surfactant so as to form a stable suspension. In general, there are residual forces at the surfaces of particles which tend to coalesce the particles when they are allowed to approach one another closely. Thus, for example, in a water suspension of cadmium sulfoselenide particles (a red transmitting filter material) extensive coalescence or flocculation would occur unless there were effective opposing forces or conditions. There are, in general, two types of stabilizing conditions which are effective in keeping finely divided materials from coalescing and which thus serve to keep them in suspension; e.g., electric charge or potential and hydration. Hydration is the principal stabilizing condition for hydrophilic colloids, such as gelatin, where relatively thick layers of water molecules are adsorbed on the surfaces and keep the particles from approaching closely. However, a cadmium sulfoselenide pigment suspension, for example, requires a favorable electrical condition.

Sulfide and selenide particles generally exhibit negative charge when suspended in water. This results from the fact that there is some reaction with water, and that sulfide is strongly adsorbed, particularly the stabilizing $HS^-$ ions. This leaves the balancing $H^+$ ions which are diffused through the surrounding water. Thus, we have like negative charge on the particles which tends to provide the needed opposing force. However, the charge and accompanying zeta potential are relatively low under these conditions. The dispersion and stability of the particles can be greatly increased by adding extra sulfide ions. This can be accomplished by using a sulfide ion containing material such as hydrogen sulfide, ammonium sulfide, or preferably, ammonium polysulfide. The sulfide or hydrosulfide ions, being strongly adsorbed, increase the negative charge at the surfaces and the balancing $H^+$ or $NH_4^+$ ions diffuse through the surrounding water and set up a potential difference. A portion of these ions near the surface are so strongly attracted that they are essentially immobile and so form along with the charged surface the electric double layer (Stern potential).

The Gouy electrokinetic or zeta potential is the potential difference between the outer boundary of this relatively immobile layer and the body of the solution which carries the remainder of the $H^+$ ions. Addition of extra $H^+$ ions (an acid) results in a decrease of zeta potential through increased adsorption of $H^+$ and at a certain level, not necessarily zero, the sol will flocculate. (A similar result follows from addition of other cations, the higher the valence, the more the effectiveness; $Ba^{++}$ is more effective than $H^+$ and $Na^+$, and $Al^{+115 +}$ is even still more effective).

In keeping with the example of a cadmium sulfoselenide pigment slurry when this slurry is prepared according to this invention it is well dispersed and stable because we have first added extra strongly adsorbed sulfide ions, which results in a relatively high negative zeta potential causing the particles to repel one another, and then we have selected only the fraction containing the fine particles. The amount of sulfide ions which is added to the pigment slurry is generally very small and depends on the physical characteristics of the suspension. To achieve a stable dispersion of the pigment particles a pigment slurry containing about 0.01 to 0.00001 gram per ml. of sulfide ion appears to be eminently suitable. Other anionic dispersants such as pyrophosphate ($P_2O_7^{----}$) or alkyl or aryl sulfonates could be used in place of sulfide, but sulfide was choosen because it adds no extraneous material to the solution. Selenide would not be extraneous, but it is avoided because of its toxicity. It is noted that the avoidance of extraneous materials applies also to the cadmium sulfoselenide pigment itself.

In order to provide a uniform and continuous deposition of the filter or phosphor pigment particles on the phosphor particles it is necessary that the latter exhibit a positive zeta potential so that the negative pigment particles are attracted to them. Since, for example, the rare earth oxides have amphoteric properties, the electrical sign of the potential can be changed by varying the pH of the medium, the sign being positive on the low pH side of the isoelectric (electrically neutral) point, the actual pH of the isoelectric point varyingamong the different oxides. Also, since the zeta potential can be decreased by adding ions of opposite charge, an oxide surface which carries a positive potential at a given (relatively low) pH can be brought to electrical neutrality by adding anions to the medium. Thus, for example, if we should use an excess of ammonium polysulfide in making up a cadmium sulfoselenide pigment slurry, the free sulfide ions would tend to decrease the positive potential of the phosphor surface and diminish their attraction of pigment particles. In preparing a slurry of positively charged red rare earth phosphor particles, the pH of the slurry should be adjusted to below about 9.0. Of course, the actual pH is dependent on the particular phosphor which is being coated with the film of filter material or phosphor material. It is noted that in referring to adjusting the pH of the aqueous slurry of phosphor particles to below about 9.0 whereby a positive charge is imparted to the phosphor particles, two basic concepts are being described. First, there is the process in which an acid solution is added to the slurry so as to obtain the necessary pH of the slurry and thus impart a positive charge to the phosphor particles. Second, there is the process in which the aqueous slurry of the phosphor particles is at the proper pH as a result of the characteristics of the phosphor. Thus, an acidic solution would not be added to the slurry since the proper pH would be achieved upon formation of the aqueous slurry.

The systems which are within the purview of the invention, while generally being rather complex systems, are nevertheless subject to control. For example, the lanthanum oxysulfide phosphor has such surface characteristics that control is not particularly difficult. Thus, the isoelectric point occurs at a favorable pH; i.e., the phosphor has a good positive potential at the normal pH of the mixture of phosphor-water and pigment slurries. On the other hand a system using gadolinium oxide is different in that a lower pH (i.e., pH of approximately 4.5 to 7.4) is required to provide a good positive potential while, at the same time, avoiding flocculation of the pigment due to excess $H^+$ ions. In this case the required balance can be achieved by pretreatment of the phosphor with dilute acid to neutralize any excess alkali and induce a favorable degree of hydration. Favorable deposition can, if necessary be insured by adding a small amount of very dilute acid to the phosphor-pigment suspension with stirring, thus increasing the positive potential of the phosphor without flocculating the pigment. The need for this pretreatment of the phosphor with acid would of course vary with the amount of alkali present. A gadolinium oxide phosphor which does not contain alkali metal ions may not require any acid treatment.

Besides the lanthanum oxysulfide and gadolinium oxide phosphors there are numerous other rare earth phosphor systems having refractory properties which are within the purview of this invention. For example, yttrium oxide, gadolinium oxysulfide, and yttrium oxysulfide are other rare earth phosphors which can be activated with europium and coated with a red filter material according to the invention. The invention is not limited to applying a filter material to the pure host crystals. For example, in lanthanum oxysulfide, part of the lanthanum may be replaced by yttrium and in gadolinium oxide, part of the gadolinium may be replaced by yttrium. Also, traces of other activators such as samarium may be added. Terbium activated lanthanum, gadolium, or yttrium oxysulfide phosphors, all of which can produce a green emission, can be coated with a yellow filter material such as cadmium sulfide to filter out undesirable blue emissions, thereby enhancing the green emission. Europium activated lanthanum, yttrium, or gadolinium oxysulfides which produce a yellow emission can be coated with a yellow filter material such as cadmium sulfide.

The phosphor coated phosphors which are within the purview of the invention also encompass a rather large number of possible systems. For example, the phosphor particles can be any of numerous red, blue, green or yellow emitting phosphors which in turn can be coated with phosphor coatings having either red, blue, green or yellow emission characteristics. Thus, for example, red emitting phosphor particles such as europium activated yttrium oxide, gadolinium oxysulfide or yttrium oxysulfide can be coated with a green emitting phosphor such as copper activated zinc sulfide or silver activated zinc-cadmium sulfide. These same red phosphors could be coated with a blue emitting phosphor such as silver or zinc activated zinc sulfide or a yellow emitting phosphor such as silver activated cadmium-zinc sulfide. Depending upon the energy of the electrons used in excitation of the phosphor-coated phosphor particles, the color emitted will be either the emitting color of the phosphor core particle, or the emitting color of the phosphor coating (or, if both phosphors are simultaneously excited, a mixture of the emission colors of the phosphor core and the phosphor coating). Thus, for example, if the phosphor core is a red emitting phosphor and the phosphor coating is a yellow emitting phosphor, one can obtain a multicolor display from such particles of yellow, if low voltages are applied, or red at high voltages, or shades of orange at intermediate voltages. A red phosphor coated with a green phosphor coating will emit green at low voltages, red at high voltages and colors ranging from yellow-green to yellow-orange at intermediate voltages. It is a significant advantage of the new phosphors that the color emitted by either, the core or the coating may readily be produced, substantially, uncontaminated by the color of the unexcited phosphor. Thus with the new phosphor-coated phosphors a reliably predictable color display in a cathode ray tube image screen may be produced with considerable tolerance in the applied voltage to the cathode ray gun. Such is not the case with prior art phosphors of graded composition from core to surface.

In order to produce a dense layer of pigment (filter or phosphor coating) on the surface of the phosphor particles, the pigment dispersing agent should be of the type which will not leave residues after drying or baking. Such residues may impede sintering of the pigment layer. It is also desirable to have as the dispersing agent a compound whose dispersing properties are relatively easily neutralized by interaction with the phosphor surface in an aqueous medium. Both of these characteristics are found in a dilute solution of ammonium polysulfide. This solution can be prepared by contacting hydrogen sulfide gas with aqueous ammonia until a satisfactory sulfide ion concentration is produced. Aging this solution in the presence of air will result in the formation of polysulfide. An ammonium polysulfide solution containing about 0.025 g of sulfur per milliliter was found to be particularly satisfactory when coating red rare earth phosphors with cadmium sulfoselenide.

Pigment coatings having the best optical properties are prepared from pigment slurries in which substantially all of the pigment particles greater than 1½ microns have been removed by elutriation. The phosphor particles which are coated with the pigment are up to about 100 times the size of the pigment particles. By employing such a particle size differential the small pigment particles are able to completely surround the larger phosphor particles and form a substantially continuous film of the pigment on the phosphor particles.

When the phosphor is slurried in water prior to application of the pigment, a certain amount of ions are released into the solution. If the concentration of these ions (Alkali metal, Rare earth, Hydrogen, etc.) is too high, coagulation of the pigment particles with themselves will occur rather than adsorption of the pigment onto the phosphor surface. An ideal situation is to have the slurry essentially free to ions for a short period of time so that after the pigment slurry is added, ions that are released from or attached to the surface of the phosphor will produce a condition causing coalescence of the pigment with the phosphor surface. For example, in the case of the $La_2O_2S$: Eu phosphor, it is thought that the primary source of ions is due to hydrolysis of the oxysulfide, producing hydroxide, sulfide and ultimately, hydrogen ion. With an oxide phosphor of the type $RE_2O_3$:Eu, (RE = rare earth) the positive ions may be produced by rinsing the phosphor with an acid or by incorporating ions such as alkali metal ions in the phosphor lattice. Any condition that will affect the concentration of the coagulating ion or condition of the phosphor surface (temperature, time, solubility, etc.) will also affect the behavior of the pigment in the adsorption reaction with the phosphor.

After the pigment-coated phosphor is dried, the phosphor particles should be heat-treated to produce as dense a pigment layer as possible. This serves three purposes: the pigment layer is more stable to mechanical processing such as sieving; it is more transparent to the desired radiation and has improved reflectance characteristics; and finally, it provides additional protection for the underlying phosphor to chemical attack. To prevent damage to the phosphor or pigment; the particles are sintered in a non-oxidizing atmosphere. The sintering operation is an extremely important step in the process. In order to produce phosphor particles. which when used in a television system will exhibit a relatively high brightness to reflectance ratio, it is necessary that the pigment form a dense and substantially continuous film of the pigment coating on the phosphor particles. This is accomplished by heating at such a temperature and time that sintering occurs and the pigment particles which are coated on the phosphor particles, fuse together and form a dense and substantially continuous filter film. The effective temperature range for sintering is about 900°F to 1500°F, the time being variable depending on the temperature.

The phosphors used in our invention advantageously may be manufactured in accordance with the process disclosed in our co-pending application, Ser. No. 685,219, filed Nov. 22, 1967. These phosphors have trace amounts of one or more retained alkali metals (e.g., sodium, lithium, and potassium) in the phosphor matrix in an amount below about 0.5% by weight of the phosphor. We have discovered that when such alkali containing rare earth phosphors are coated with a layer of filter or phosphor material in accordance with this invention, the alkali is effective (acting similar to a flux) in promoting the formation of highly condensed and continuous layers of the filter material or phosphor material, and bonding these pigment coatings to the phosphor. In coating the phosphors in accordance with our invention, the alkali contained therein is caused to migrate from the interior of the phosphor to its surface as a result of the heat from the sintering operation. Thus, upon sintering, one or more of the alkali metals becomes available at the juncture between the phosphor and the pigment, serving to promote the desired reactions. This is evidenced by the fact that upon sintering for example an ordinary red phosphor having no color filter layer, the alkali migrates to the surface of each phosphor particle in such a manner that it can readily be washed off. It is also believed that with these phosphors, it is the alkali ions which are effective in promoting the encapsulation of the coated phosphors with polyvinyl alcohol. The fluxing action of the alkali permits the sintering operation to be performed at lower process temperatures, thus avoiding handling problems, preventing the phosphors from being degraded due to high sintering temperatures, and increasing the likelihood of achieving a high ratio of brightness to reflectance.

In order to provide the pigmented phosphor with additional stability to withstand processing for the preparation of color television tubes, it is desirable to encapsulate the composite particle with a film-forming resin material. A suitable material is polyvinyl alcohol. However, any of the other well-known water soluble film forming resins used for coating phosphor particles could be used, for example, cellulose derrivatives, gelatin, pectins and other water soluble film forming resins. The preferred method involves preparing a solution of polyvinyl alcohol and potassium titanium oxalate. The titanium ion is one of many that produces gelling of PVA in a basic solution. Borate ion will also gel PVA, but this reaction is more difficult to control. After the sintering operation, the phosphor is added to a solution of PVA and the titanium compound. It has been observed that the pigmented phosphor is capable of producing a sufficient quantity of cations which initiate the gelation reaction between the PVA and titanium species. This reaction occurs at the surface of the pigmented phosphor resulting in the formation of a gel coating which surrounds the particles. The next step is to dehydrate the gel and increase its density with at least a sufficient amount of a miscible non-aqueous solvent such as a ketone or an alcohol, and then dry the particles.

The invention will be described in detail with reference to the following examples for illustrative purposes.

EXAMPLE I

In the preparation of cadmium sulfoselenide pigment slurry, 100 ml of deionized water, 4 ml of an ammonium polysulfide solution containing about 0.025 gram of sulfur per ml and 1 ml of a non-ionic surfactant, such as a 10% solution of an alkyl phenyl ether of polyethylene glycol, were mixed together. While the mixture was being stirred, 40 grams of cadmium sulfoselenide pigment which was washed to remove all interfering material was added and dispersed in the mixture by ultrasonic means for about 10 minutes. The pH of the slurry was approximately 7.8. An equivalent method for dispersing the pigment would be to use a blender. The slurry was then diluted with deionized water to about 750cc and then allowed to stand for about 24 hours. After this time, the supernatant was decanted. The pigment content of the slurry was then determined by gravimetric means.

One hundred grams of a $La_2O_2S$:Eu phosphor was then mixed in 100 ml of deionized water to form a slurry which then had a pH of approximately 8.5. After stirring for about 10 minutes, 46.8 mls of the cadmium sulfoselenide pigment slurry which contained about 0.0374 g/ml of pigment was slowly added. The condition of the lanthanum oxysulfide slurry was such that the particles possessed a good positive charge. Therefore, no addition of any solution for adjusting the pH of the slurry was necessary. The mixture was then stirred for about 5 minutes and filtered. The recovered coated phosphor was then dried for about 4 hours at a temperature of about 240°F. After the coated phosphor was dried, it was heated in a non-oxidizing atmosphere for 2 hours at a temperature of 1300°F. This sintering procedure resulted in the formation of a continuous and condensed film of cadmium sulfoselenide around the $La_2O_2S$: Eu phosphor particles.

EXAMPLE II

A cadmium sulfoselenide pigment slurry was made according to the procedure followed in Example I except that the elutriation time was about 48 hours. One hundred grams of $Gd_2O_3$: Eu phosphor was then mixed in 100 ml of deionized water and stirred for about 20 minutes. Then 1 ml of 6N acetic acid was added to the mixture and stirring was continued for about 2-3 minutes. The $Gd_2O_3$:Eu slurry having a pH of approximately 6.4 was then filtered and washed four times with a total of about 200 ml of deionized water. The resulting phosphor wet cake was then reslurried in about 100 ml of water, and while stirring, 40.3 ml of the cadmium sulfoselenide pigment slurry containing about 0.0186 g of pigment per milliliter of slurry was added. The stirring was continued for about 5 minutes. The coated phosphor was recovered by filtration and then dried for about 4 hours at a temperature of about 225°F. After the coated phosphor was dried, it was heated in a non-oxidizing atmosphere for 2 hours at a temperature of 1300°F. This sintering procedure resulted in the formation of a continuous and condensed film of cadmium sulfoselenide around the $Gd_2O_3$: Eu phosphor particles.

EXAMPLE III

An encapsulating solution was prepared by mixing together 90 grams of a 5% polyvinyl alcohol (PVA) solution 201 cc of 0.135 molar potassium titanium oxalate and 0.6cc of 3N hydrochloric acid, and then diluting the mixture to 900 grams. One hundred grams of the cadmium sulfoselenide coated $La_2O_2S$: Eu phosphor, as prepared in Example I, was added to 100 grams of the encapsulating solution and the mixture was stirred vigorously. After about 3 minutes, 100 ml of absolute methanol was added to the slurry and the resulting mixture was stirred vigorously for about 5 minutes. The slurry was then filtered and the phosphor was then washed three times, using about 50 ml of methanol at each wash. The phosphor was then dried for about 2 hours at a temperature of about 225°F. This procedure resulted in the encapsulation with PVA, of cadmium sulfoselenide coated $La_2O_2S$: Eu phosphor particles.

EXAMPLE IV

An encapsulating solution was prepared by mixing together 90 grams of a 5% polyvinyl alcohol (PVA) solution and 201cc of 0.135 molar potassium titanium oxalate and then diluting this mixture to 900 grams. One hundred grams of the cadmium sulfoselenide coated $Cd_2O_3$:Eu phosphor, as prepared in Example II, was added to 100 grams of the encapsulating solution and the mixture was stirred vigorously. While stirring vigorously, 100 ml of a mixture containing 65% methyl ethyl ketone and 35% methanol was added to the stirred mixture and the stirring was continued for about 5 minutes. The slurry was then filtered and the phosphor was then washed three times, using about 50 ml of methanol at each wash. The phosphor was then dried for about 2 hours at a temperature of about 225°F. This procedure resulted in the encapsulation with PVA, of cadmium sulfoselenide coated $Gd_2O_3$:Eu phosphor particles.

EXAMPLE V

In the preparation of yellow filter coated yellow phosphor, 50 grams of $La_2O_2S$:Eu (3% Eu), a yellow emitting phosphor, was suspended in 200 ml of water. Thirteen mls of a 1-molar $GdCl_2$ solution was added to the phosphor containing solution and the mixture was stirred. Diluted hydrochloric acid solution (3N) was then added to the mixed solution in 2 ml portions until the phosphor became colored a deep yellow color. Thereafter, the slurry was filtered, rinsed with water and dried for 16 hours at 110°C. After drying, the resulting powder was heated to 1300°F in a non-oxidiizing atmosphere to sinter the pigment coating. This resulted in the formation of a continuous and condensed film of CdS around the $La_2O_2S$:Eu (3% Eu) phosphor particles. The CdS coating formed a highly transparent yellow color filter which substantially increased the contrast characteristics of the yellow-emitting but normally white body colored core phosphor.

EXAMPLE VI

In the preparation of a phosphor coated phosphor the following procedure was used: A slurry of a fluorescent pigment was prepared by mixing together 4.0 grams of a green emitting copper activated zinc sulfide phosphor having an average particle size of about one micron (measured on a Fisher sub-sieve sizer) with 50 ml of deionized water, 1 ml of 1.0 molar cadmium chloride solution, one ml of sulfuric acid and one ml of a 10% solution of an alkyl-aryl polyether alcohol surfactant. This mixture was milled for 45 minutes in a 2 oz. milling jar containing about 25 ml of zirconia beads. After milling, the beads were separated from the phosphor slurry by straining through a 30 mesch screen.

A second slurry was prepared by mixing together about 100 g of orange emitting europium activated lanthanum oxysulfide phosphor and 100 ml of deionized water and stirring for one-half hour. The zinc sulfide fluorescent pigment slurry then was added to the orange emitting phosphor slurry. After further stirring for about 1 hour the mixture was filtered and dried at 110°C for 16 hours.

The pale yellow colored dried material was then heated in a closed crucible at 1100°F for 2 hours. After sieving through a 325 mesh screen, the resulting phosphor-coated phosphor was used to prepare a cathode ray tube screen.

The cathode ray tube emitted bluish green light when excited by low energy electrons and orange light when excited by high energy electrons.

We claim:

1. A phosphor composite in particulate form, each particle comprising a phosphor core of substantially uniform composition throughout, substantially completely surrounded by a coating which modifies the luminescent quality of the composite, said coating comprising a filter coating (a) being of a thickness such as to permit the transmission therethrough of at least a portion of the light emitted by the phosphor core particle, (b) being of substantially uniform composition throughout its thickness, and (c) being coalesced into a substantially continuous film enveloping the underlying phosphor core particle and leaving substantially no portion thereof uncovered, there being no barrier layer between said phosphor core and said coating.

2. A phosphor composite according to claim 1, wherein each phosphor core particle is completely surrounded by a filter coating, said coating being sintered into a substantially continuous film forming a filter layer about the phosphor particles and being substantially free of discrete granules of the coating material, there being essentially no interdiffusion of said coating with said phosphor.

3. A phosphor composite according to claim 2 wherein one or more alkali metals is present at the juncture between the phosphor and the coating.

4. A phosphor composite according to claim 3 wherein the alkali metal comprises below about 0.5% by weight of the phosphors, said alkali metal selected from the group consisting of sodium, potassium, lithium and mixtures thereof.

5. A phosphor composite according to claim 2 wherein a substantially transparent protective coating of a resin surrounds said filter layer.

6. A phosphor composite according to claim 5 wherein the resin is polyvinyl alcohol.

7. A phosphor composite according to claim 2 wherein the phosphor particles are red emitting phosphors and the filter layer is cadmium sulfoselenide.

8. A phosphor composite according to claim 7 wherein the phosphor is a red rare earth phosphor selected from the group consisting of red rare earth oxide phosphors, red rare earth oxysulfide phosphors and red rare earth vanadate phosphors.

9. A phosphor composite according to claim 8 wherein the red phosphor is a europium activated rare earth phosphor selected from the group consisting of gadolinium oxide, yttrium oxide, gadolinium oxysulfide, lanthanum oxysulfide and yttrium oxysulfide.

10. A phosphor composite according to claim 2 wherein the phosphor particles are yellow emitting phosphors and the filter layer is cadmium sulfide.

11. A rare earth phosphor composition comprising particles of a europium-activated red rare earth phosphor selected from the group consisting of gadolinium oxide, yttrium oxide, gadolinium oxysulfide, lanthanum oxysulfide and yttrium oxysulfide, each particle being substantially completely surrounded by a filter coating of cadmium sulfoselenide, said coating being sintered into a substantially continuous film forming a red transmitting filter layer and being substantially free of discrete granules of the coating material, and each particle further having a substantially transparent protective coating of a resin surrounding said filter layer, there being essentially no interdiffusion of said coating with said phosphor, there being no barrier layer between said particles and said filter layer.

12. The rare earth phosphor composition according to claim 11 wherein the resin is polyvinyl alcohol.

13. A rare earth phosphor composition comprising europium activated gadolinium oxide particles, each particle being substantially completely surrounded by a filter coating of cadmium sulfoselenide, said coating being sintered into a substantially continuous film forming a red transmitting filter layer and being substantially free of discrete granules of the coating material, and a protective coating of a polyvinyl alcohol resin surrounding said filter layer, there being essentially no interdiffusion of said coating with said phosphor, there being no barrier layer between said particles and said filter layer.

14. A rare earth phosphor composition comprising europium activated yttrium oxide particles, each particle being substantially completely surrounded by a filter coating of cadmium sulfoselenide, said coating being sintered into a substantially continuous film forming a red transmitting filter layer and being substantially free to discrete granules of the coating material, and a protective coating of a polyvinyl alcolhol resin surrounding said filter layer, there being essentially no interdiffusion of said coating with said phosphor.

15. A rare earth phosphor composition comprising europium activated lanthanum oxysulfide particles, each particle being substantially completely surrounded by a filter coating of cadmium sulfoselenide, said coating being sintered into a substantially continuous film forming a red transmitting filter layer and being substantially free of discrete granules of the coating material, and a protective coating of a polyvinyl alcohol resin surrounding said filter layer, there being essentially no interdiffusion of said coating with said phosphor.

16. A phosphor composite according to claim 1, wherein each phosphor core particle is substantially completely surrounded by a phosphor coating which emits light of different color than the phosphor core.

17. A phosphor composite according to claim 16 wherein a substantially transparent protective coating of a resin surrounds said phosphor coating.

18. A phosphor composite according to claim 16 disposed on the image screen of a cathode ray tube, whereby said screen luminesces with light predominantly of the color emitted by the phosphor core wherein the energy of the cathode ray beam is relatively high and luminesces with light predominantly of the color emitted by the phosphor coating when the energy of the cathode ray beam is relatively low and luminesces with light of a mixture of said colors when the enregy of the cathode ray beam is intermediate said relatively high and relatively low energies.

19. A cathode ray tube comprising a phosphor-coated image screen and means for projecting a beam of cathode ray electrons against said phosphor coating, characterized in that said phosphor coating comprises a phosphor composite according to claim 16.

20. A red phosphor composition comprising particles of a red emitting phosphor, each phosphor particle being substantially completely surrounded by a coating of cadmium sulfoselenide, said coating being sintered into a substantially continuous film forming a red transmitting filter layer about the phosphor particle and being substantially free of discrete granules of the coating material, there being essentially no interdiffusion of said coating with said phosphor, there being no barrier layer between said particles and said coating.

21. A phosphor composition according to claim 20 characterized in that one or more alkali metals is present at the juncture between the phosphor and the coating.

22. A phosphor composition according to claim 21 in which the alkali metal comprises below about 0.5% by weight of the phosphors, said alkali metal selected from the group consisting of sodium, potassium, lithium and mixtures thereof.

23. A phosphor composition accoring to claim 20 characterized in that a substantially transparent protective coating of a resin surrounds said filter layer.

24. A phosphor composition according to claim 20 in which the red phosphor is a red earth phosphor selected from the group consisting of red rare earth oxide phosphors and red rare earth oxysulfide phosphors.

25. A phosphor composition according to claim 20 in which the red phosphor is a europium activated rare earth phosphor selected from the group consisting of gadolinium oxide, yttrium oxide, gadolinium oxysulfide, lanthanum oxysulfide and yttrium oxysulfide.

* * * * *